(12) United States Patent
Yerramalli et al.

(10) Patent No.: US 8,816,635 B2
(45) Date of Patent: Aug. 26, 2014

(54) CHARGING SYSTEM USING SODIUM LEVEL CONTROL IN INDIVIDUAL SEALED ANODE TUBES

(75) Inventors: Chandra Sekher Yerramalli, Niskayuna, NY (US); Badri Narayan Ramamurthi, Clifton Park, NY (US); Reza Sarrafi-Nour, Clifton Park, NY (US); Andrew Philip Shapiro, Schenectady, NY (US); Anil Raj Duggal, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 378 days.

(21) Appl. No.: 13/249,830

(22) Filed: Sep. 30, 2011

(65) Prior Publication Data
US 2013/0082642 A1    Apr. 4, 2013

(51) Int. Cl.
*H02J 7/00*    (2006.01)
*H01M 2/00*    (2006.01)
*H01M 4/36*    (2006.01)
*H01M 2/34*    (2006.01)
*H01M 10/46*    (2006.01)

(52) U.S. Cl.
CPC .............. *H02J 7/0042* (2013.01); *Y02E 60/12* (2013.01); *H01M 10/46* (2013.01); *Y02E 60/526* (2013.01); *H01M 2/34* (2013.01)
USPC .............. 320/107; 429/61; 429/103; 429/104

(58) Field of Classification Search
CPC ..... Y02E 60/526; Y02E 60/12; H02J 7/0042; H01M 10/46; H01M 2/34
USPC ............................ 320/107; 429/103, 104, 61
See application file for complete search history.

(56) References Cited

U.S. PATENT DOCUMENTS

| | | | |
|---|---|---|---|
| 4,084,040 A | 4/1978 | King | |
| 4,732,824 A | 3/1988 | Bindin | |
| 6,562,496 B2 * | 5/2003 | Faville et al. | 429/423 |
| 8,647,767 B2 * | 2/2014 | Sarrafi-Nour et al. | 429/164 |
| 2008/0006604 A1 * | 1/2008 | Keady | 216/83 |
| 2008/0238372 A1 * | 10/2008 | Cintra et al. | 320/137 |

FOREIGN PATENT DOCUMENTS

JP    7192755 A    7/1995

* cited by examiner

*Primary Examiner* — M'Baye Diao
(74) *Attorney, Agent, or Firm* — Mary Louise Stanford (57) ABSTRACT

An electrochemical cell includes an anode connectable to a current tap and a charging medium in electrical contact with the anode. A switching device is configured to stop a charging operation of the electrochemical cell upon activation by the charging medium.

23 Claims, 13 Drawing Sheets

CHARGING SYSTEM USING SODIUM LEVEL CONTROL IN INDIVIDUAL SEALED ANODE TUBES

BACKGROUND OF THE INVENTION

The present disclosure generally relates to electrochemical cells. More particularly, the present disclosure relates to electrochemical cells, such as molten salt electrochemical cells (e.g., molten sodium metal chloride), having a mechanism for reducing the possibility of an overfill or overpressure condition during a charging operation of the electrochemical cells.

During a charging operation of an electrochemical cell, such as a molten salt electrochemical cell, an electrolyte (e.g., beta alumina solid electrolyte), which separates the anodic chamber from the cathodic chamber fills a space within the electrochemical cell. During a charging operation, metal ions dissociate from the molten salt (e.g., sodium ions dissociate from sodium chloride salt). The metal ions from the molten salt are conducted through the electrolyte structure and get deposited in the anode as a molten liquid metal charging medium, the possibility exists that the electrolyte may become overfilled (e.g., filled beyond a recommended level) with this charging medium. In such an overfill condition, the electrochemical cell is at risk of failure due to the possibility of an increased pressure in the anode space enclosed/separated by the electrolyte, which may rupture the electrolyte structure in the electrochemical cell.

In a battery (i.e., a plurality of electrochemical cells in electrical contact with one another) there is a potential that during a charging operation one or more of the anodes in the electrochemical cells may fill with a molten liquid metal charging medium (e.g., sodium in sodium metal chloride batteries) more rapidly than others. For example, better performing electrochemical cells of the battery may fill more rapidly than lesser performing cells during the charging operation. Thus, the possibility exists that the electrochemical cells of the battery will not evenly fill with the charging medium during the charging operation. In such a situation, the better performing cells (i.e., the more rapidly filling electrochemical cells) are at risk of an overfill condition before the lesser performing cells.

Ordinary batteries, and methods of charging, are not configured to prevent the overfill condition of better performing cells while maintaining the charging operation of the lesser performing cells. If the charging operation is not halted, the electrochemical cells in the overfill condition may rupture and/or fail. Thus, ordinary batteries may be undercharged if a charging operation of the battery is halted to prevent the better performing cells from being in an overfill condition.

Alternatively, ordinary batteries may include a connection by which the charging medium is transferred from an overfilling cell to another of the cells during a charging operation of the battery. However, such a design requires that the electrolyte of the cells be in fluid communication with one another (i.e., the cells are not individually sealed), to allow for the overfilling electrolyte to flow the charging medium from one cell to another.

The present disclosure provides an apparatus, method and charging system incorporating, for example, an electrochemical cell including a mechanism for reducing or eliminating the possibility of an overfill or overpressure condition, without requiring that the electrolytes of the electrochemical cells be in fluid contact with one another.

BRIEF DESCRIPTION OF THE INVENTION

In one aspect, a electrochemical cell includes an anode connectable to a current tap, a charging medium in electrical contact with said anode, and a switching device configured to stop a charging operation of the electrochemical cell upon activation by the charging medium.

In an another aspect, a method of charging an electrochemical cell includes providing an electrical current flow to the electrochemical cell to perform a charging operation, determining a condition of a charging medium within the electrochemical cell, and stopping the charging operation upon determining the condition of the charging medium.

In yet another aspect, a charging system for an electrochemical cell includes a current tap configured to supply an electrical current flow to the electrochemical cell. A sensor is configured to detect a condition of an charging medium within the electrochemical cell and the charging system is configured to stop a charging operation of the electrochemical cell upon detecting the condition of said charging medium. An anode of the electrochemical cell defines a cavity containing the charging medium. The anode has a first section and a second section separated by an insulating space such that the first section and the second section are not in electrical contact. The sensor is activated by the charging medium occupying the insulating space.

DETAILED DESCRIPTION OF THE INVENTION

The electrochemical cell, method of charging and system disclosed herein provide technical effects including, for example, the ability to facilitate a charging operation of an electrochemical cell and prevent an overfill condition of the electrochemical cell during the charging operation.

Figure 1:
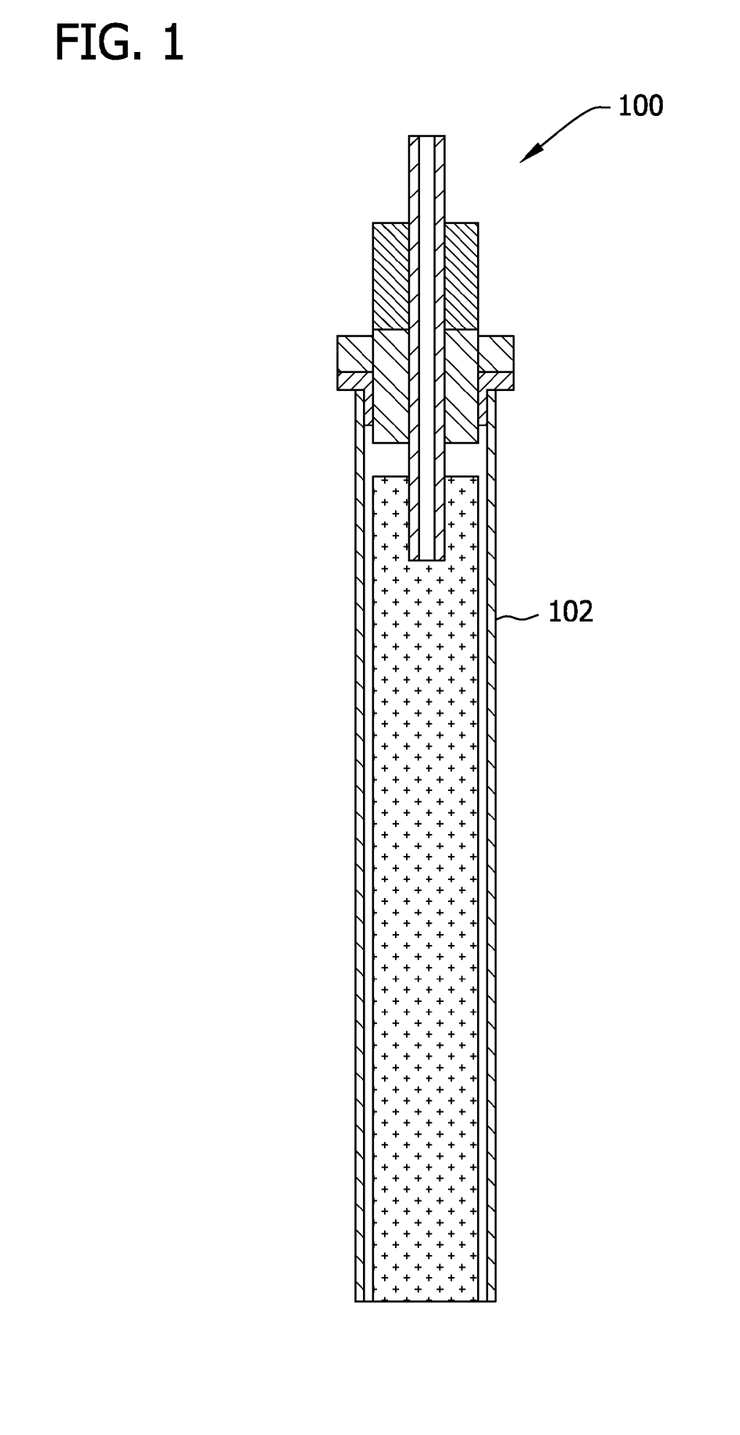
FIG. 1 is a cross section of an electrochemical cell according to the present disclosure.

Shown generally in FIG. 1 is an example cross section of an embodiment of an electrochemical cell 100, such as a molten salt (e.g., sodium chloride salt) electrochemical cell according to the present disclosure. In one embodiment, electrochemical cell 100 includes membrane 102 made from materials such as ceramics, beta alumina or the like, for example beta-alumina solid electrolyte (BASE). In another embodiment, additional outer layers (not shown), for example, protective coverings and the like, are disposed over membrane 102.

Figure 2:
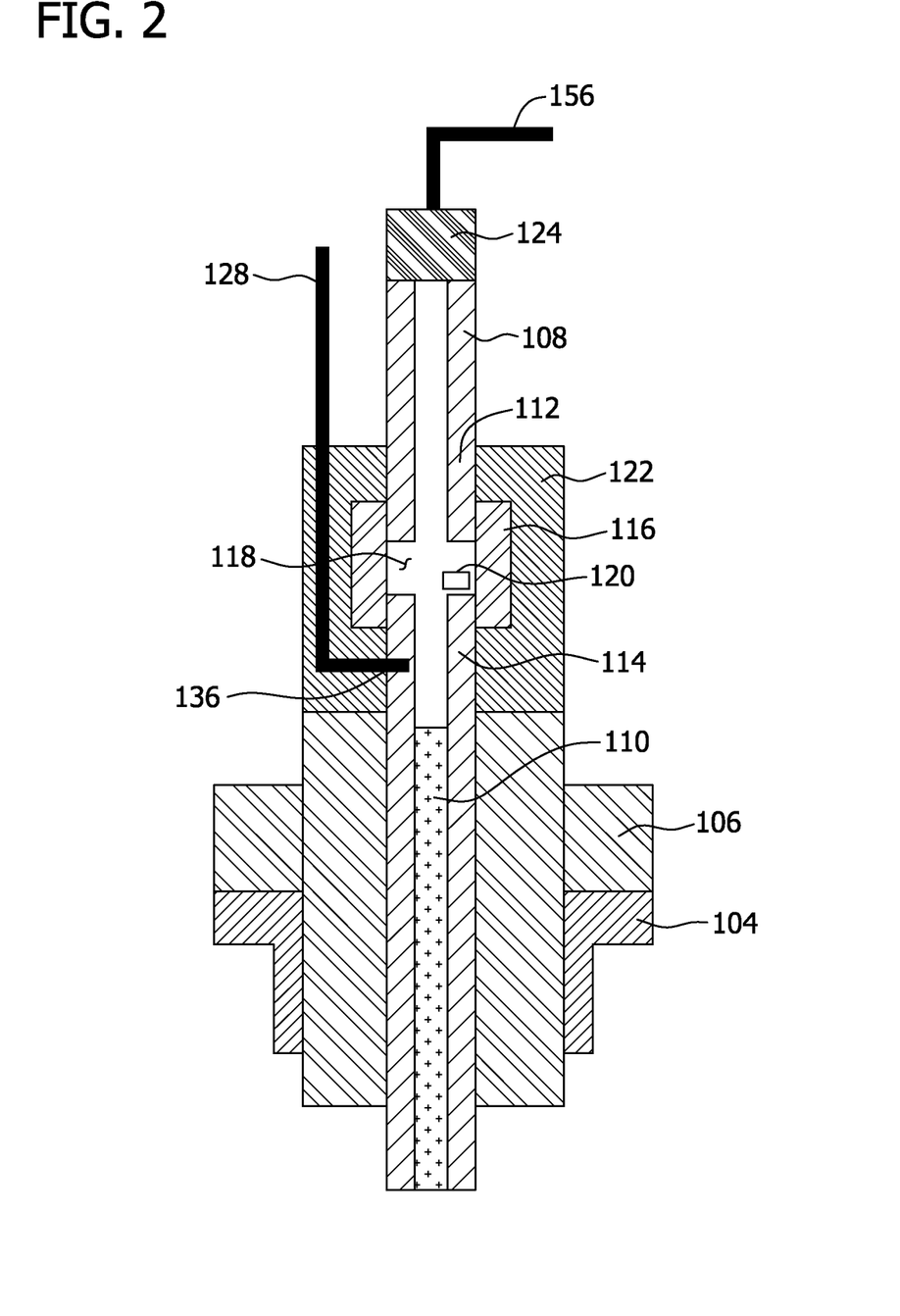
FIG. 2 is a cross section of a portion of an electrochemical cell, in a first state, according to a first embodiment of the present disclosure.

FIG. 2 shows an example cross sectional view of a portion of electrochemical cell 100 according to a first embodiment of the present disclosure. In one embodiment electrochemical cell 100 includes seals 104 to seal membrane 102 to a current feedthrough part 106 of electrochemical cell 100. In another embodiment, seals 104 hermetically seal membrane 102 to current feedthrough part 106.

An anode 108 is disposed in electrochemical cell 100. In one embodiment, anode 108 is a hollow cylindrical shape, or other geometrical shape allowing for the passage of charging medium 110 therethrough. Anode 108 is made of a conductive material, such as nickel or other metals. Anode 108 is formed having a first section 112 and a second section 114 that, in a first state, are not in electrical contact with one another. In embodiments, first section 112 and second section 114 of the anode 108 are connected by an insulating material, for example an insulating sleeve 116 formed of an insulating ceramic material such as alpha alumina, or other insulating materials. Charging medium 110 may be, for example, a molten metal, such as sodium and the like.

In one embodiment, a cavity 118 is formed between first section 112 and second section 114 of anode 108. In another embodiment, insulating sleeve 116 further defines, at least in part, a portion of walls defining cavity 118. In embodiments, cavity 118 is disposed at a location to allow a maximum charge of electrochemical cell 100 without electrochemical cell 100 being in an overfill condition. In FIG. 2, cavity 118 is shown in a first state in which cavity 118 is empty or substantially empty. In one embodiment, cavity 118 functions as a switching device. In another embodiment, cavity 118 contains a separate switching device 120. In yet another embodiment, switching device 118 is activatable by a condition of charging medium 110.

A weldcan 122 may be fashioned on current feedthrough part 106. In one embodiment, weldcan 122 is made of a conductive material, for example, nickel or other metals. In embodiments, weldcan 122 functions as a cathode of electrochemical cell 100.

In embodiments, cap 124 is fashioned to anode 108 to seal anode 108. In one embodiment, cap 124 is formed of a conductive material, for example, nickel or other metals. In another embodiment, cap 124 is removably or fixedly secured to anode 108, for example, by screwing, crimping, welding and the like.

In embodiments, a current source 126 (FIG. 7) may be connected to electrochemical cell 100 through a conductor 128 attached to anode 108.

Figure 3:
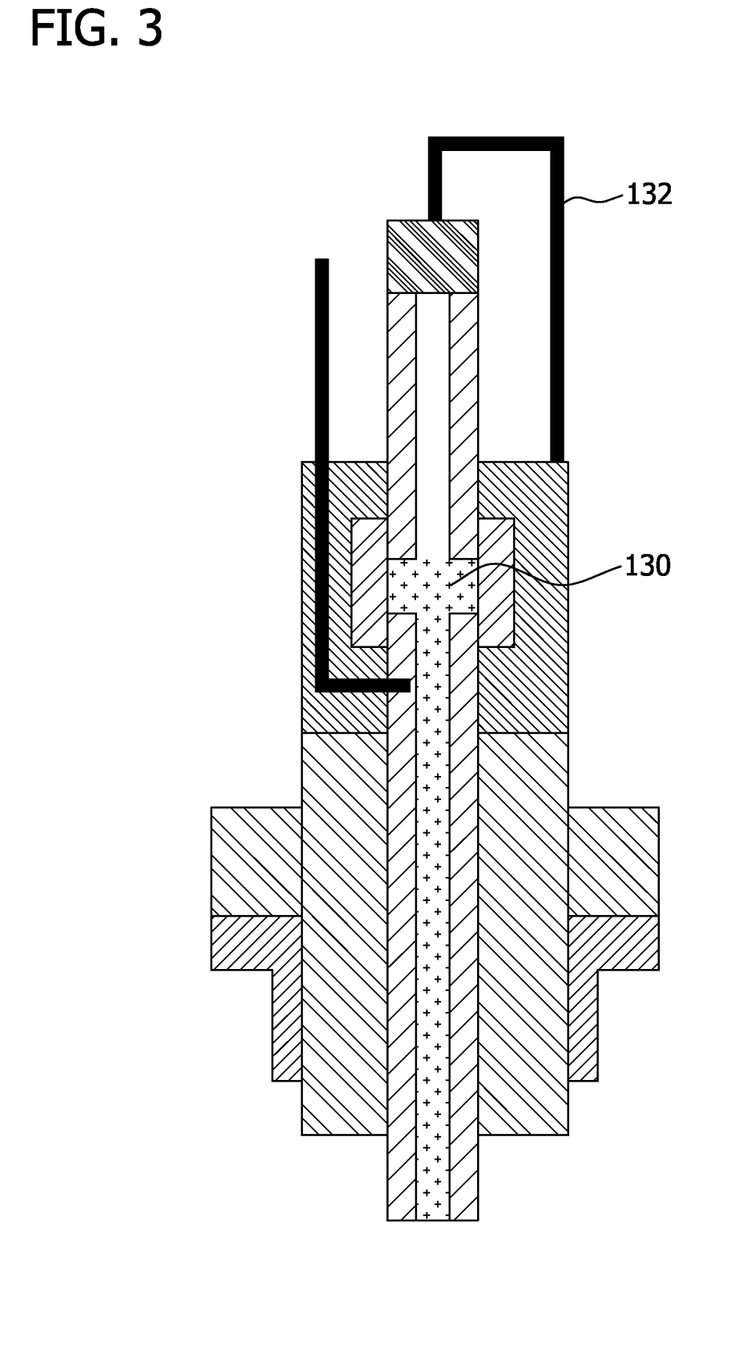
FIG. 3 is a cross section of a portion of the electrochemical cell shown in FIG. 2 in a second state.

During a charging operation of electrochemical cell 100, current source 126 is switched on to provide a current flow to anode 108 of electrochemical cell 100. In embodiments, during the charging operation, charging medium 110 flows from a reservoir (not shown) through anode 108. As the charging operation progresses, charging medium 110 flows from second section 114 toward and/or into cavity 118. FIG. 3 shows cavity 118 in an occupied state 130, wherein charging medium 110 has partially or completely filled cavity 118.

If the charging operation progresses beyond occupied state 130, charging medium 110 may continue to flow into the anode 108 and cause an overfill or overpressure condition (not shown), as detailed above.

To prevent, or substantially prevent an overfill or overpressure condition from occurring in electrochemical cell 100, a mechanism for reducing the possibility of an overfill or overpressure condition during a charging operation of electrochemical cells 100 according to the present disclosure is described.

In one embodiment, second section 114 of anode 108 is connected to weldcan 100 by a conductor 132. During a charging operation, charging medium 110 reaches a predetermined condition, for example, partially or completely filling cavity 118 such as to be in occupied state 130. In one embodiment, the condition of charging medium 110, activates a switching device that stops the charging operation of electrochemical cell 100. In another embodiment, cavity 118 being in occupied state 130, functions as the switching device. For example, in one embodiment, charging medium 110, being in the occupied state 130, causes first section 112 and second section 114 of anode 108 to be in electrical contact with one another. At such time, electrochemical cell 100 is placed in a short circuit condition based at least in part by conductor 100.

In one embodiment, switching device 120 is activated by the condition of charging medium 110 and stops the charging operation by, for example, sending a signal to a control circuit 134 (FIG. 7) to stop the charging operation, or by switching device 120 causing a short circuit of electrochemical cell 100 to stop the charging operation.

Figure 4:
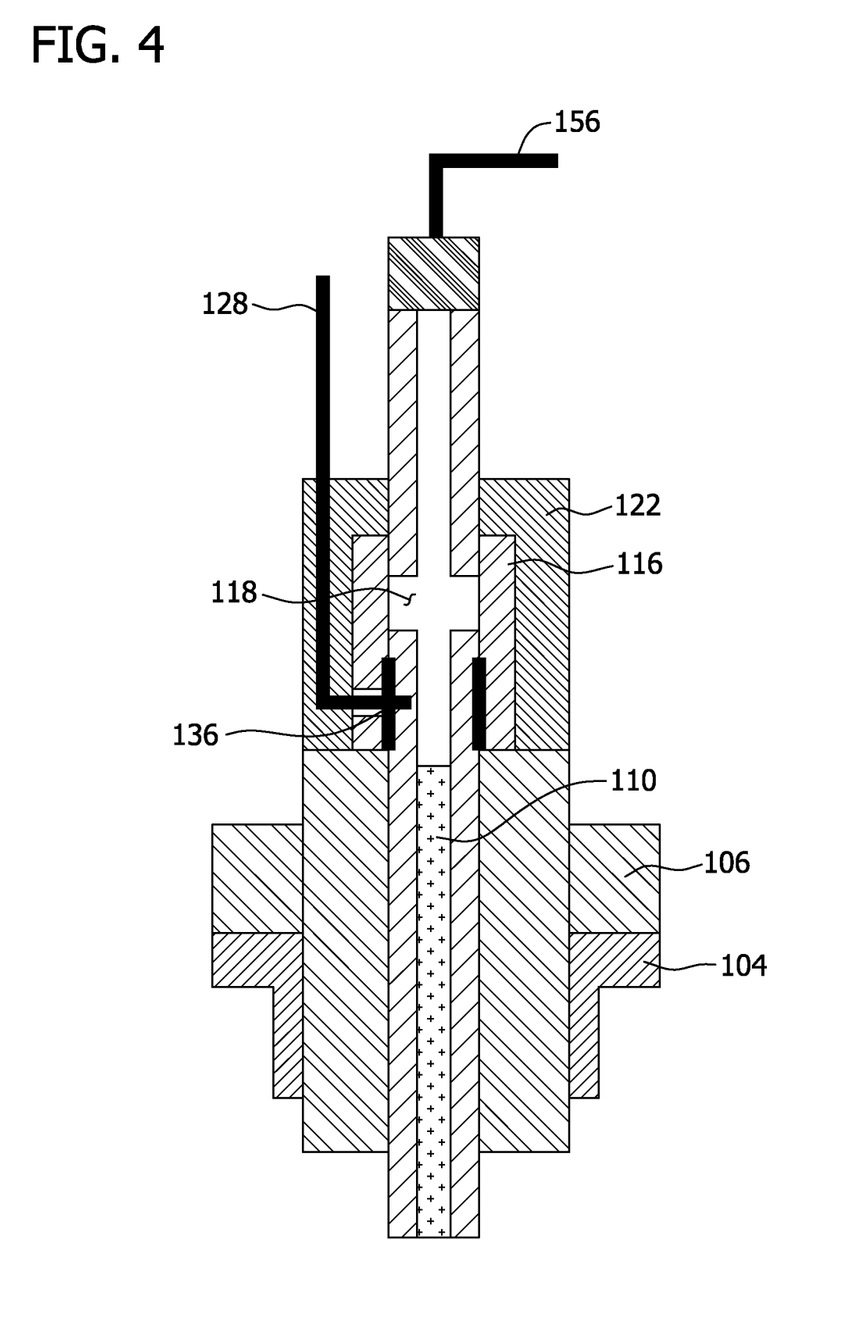
FIG. 4 is a cross section of a portion of an electrochemical cell in a first state, according to a second embodiment of the present disclosure.

In one embodiment, electrochemical cell 100 is constructed, for example, as shown in FIG. 4. In one embodiment, to possibly reduce manufacturing costs, insulating sleeve 116 is formed integrally with current feedthrough part 106. In embodiments, insulating sleeve 116 and current feedthrough part 106 are formed of the same, similar or different materials. In other embodiments, conductor 128 is attached to electrochemical cell 100 through anode 108 by a connector 136. In one embodiment, connector 136 is a through hole, a conductive sleeve, a removable connector or other known connectors.

Figure 5:
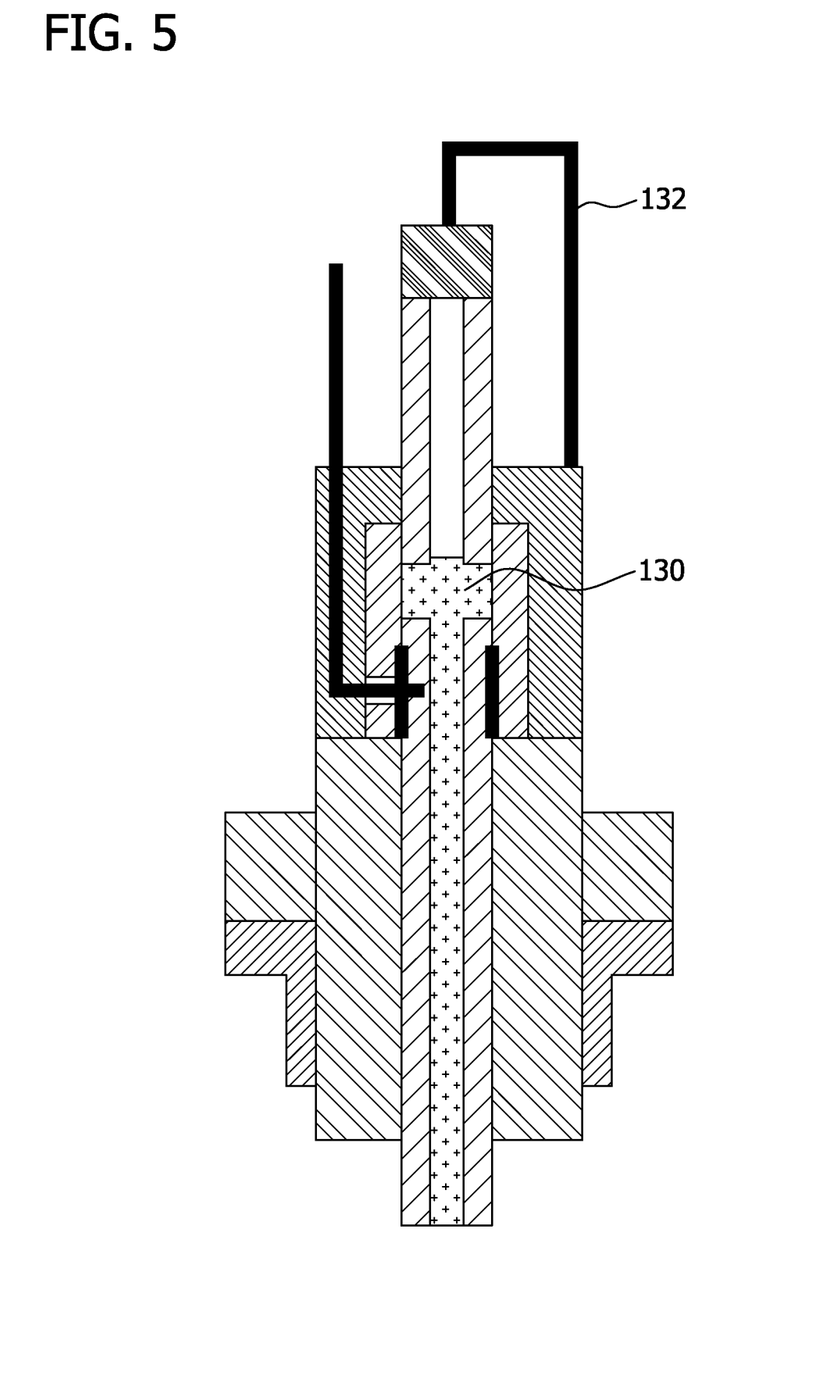
FIG. 5 is a cross section of a portion of the electrochemical cell shown in FIG. 4 in a second state.

As shown in FIG. 5, cavity 118 is in occupied state 130, which causes switching device 120 to stop the charging operation in one or of the manners discussed above.

Figure 6:
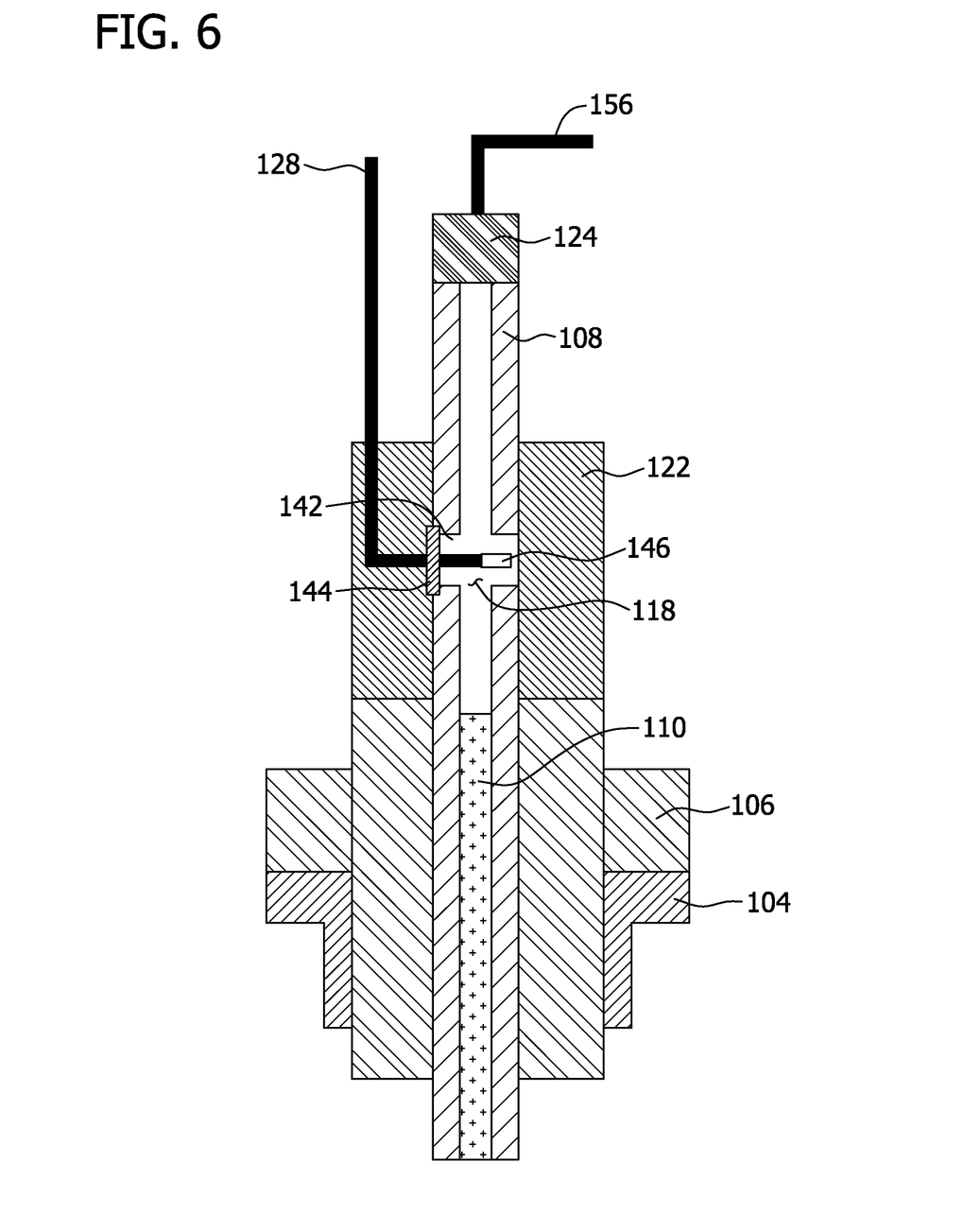
FIG. 6 is a cross section of a portion of an electrochemical cell in a first state, according to a third embodiment of the present disclosure.
Figure 7:
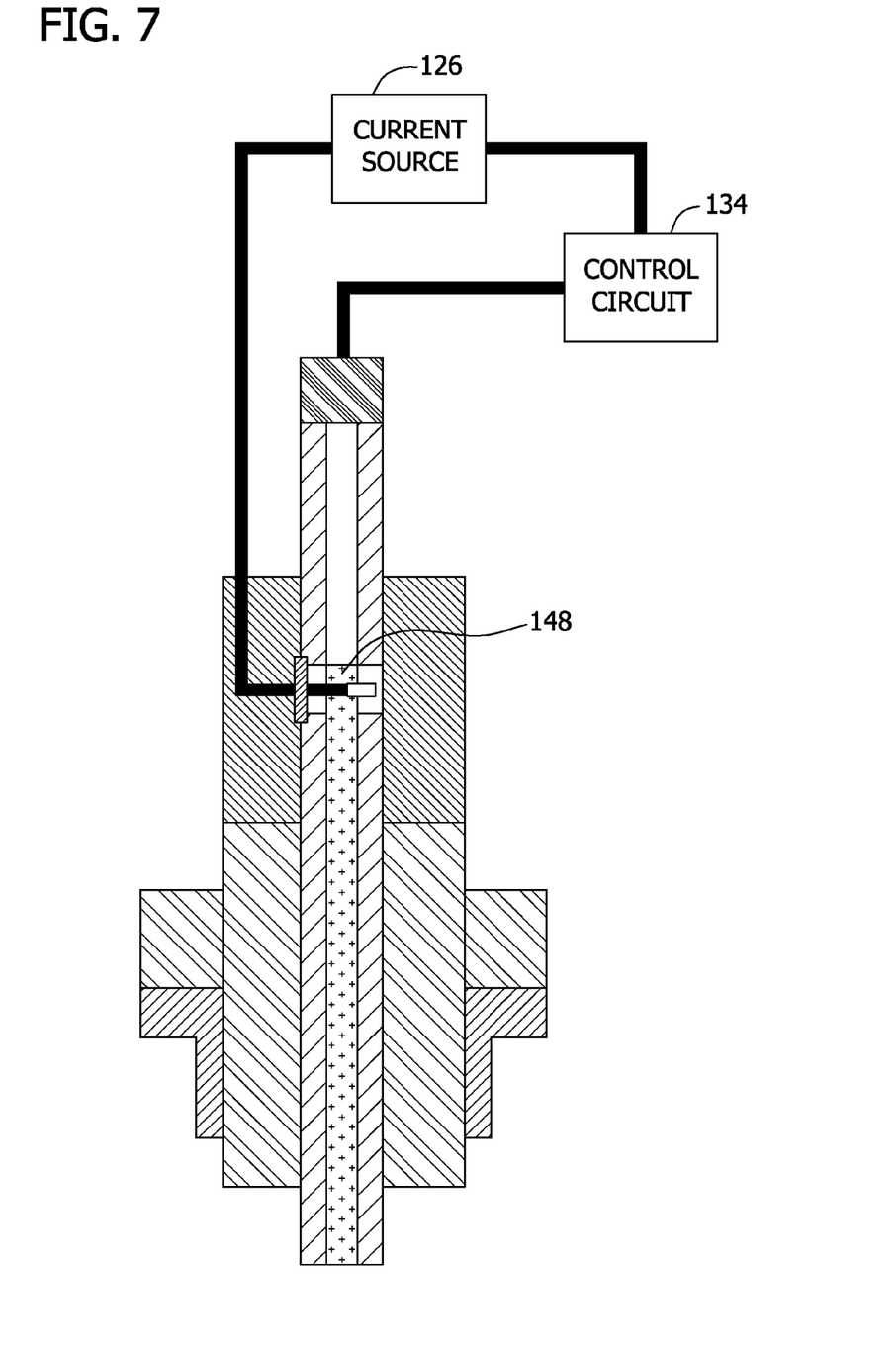
FIG. 7 is a cross section of a portion of the electrochemical cell shown in FIG. 6 in a second state.
Figure 8:
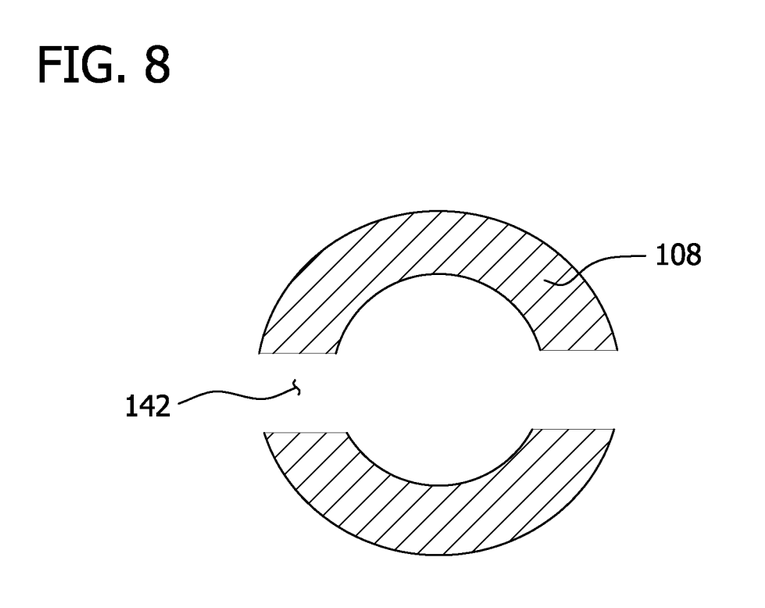
FIG. 8 is a cross section of a top view of an anode tube of an electrochemical cell of the present disclosure having a through-hole.
Figure 9:
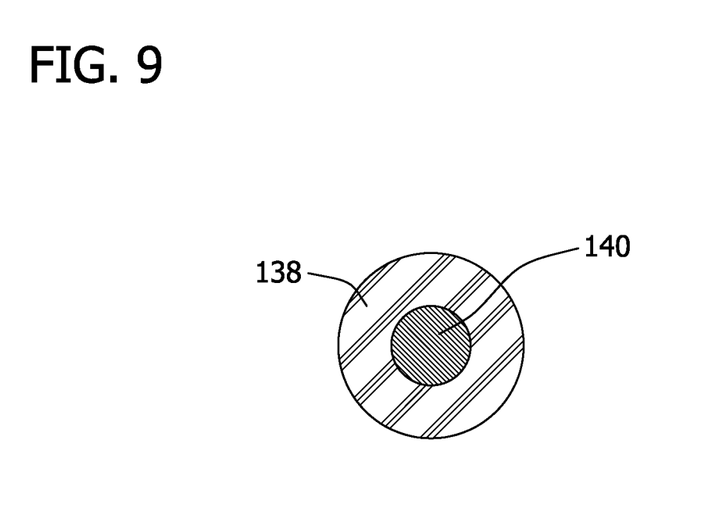
FIG. 9 is a cross section of a current tap input wire of an electrochemical cell of the present disclosure.

In one embodiment, electrochemical cell 100 is constructed as shown in FIG. 6. Conductor 128 includes an insulator 138 (FIG. 9) and a conductive portion 140. In one embodiment, conductor 128 is connected to electrochemical cell 100 through a throughhole 142 (FIG. 8) formed in anode 108. In another embodiment, a seal 144 is used to seal the connection between conductor 128 and electrochemical cell 100. In yet another embodiment, conductive portion 140 includes sensor 146 that is configured to sense a condition of charging medium 110. The sensed condition is, for example, the presence, absence, volume, height, weight, temperature or other conditions of charging medium 110. In still another embodiment, as shown in FIG. 7, charging medium 110 contacts conductive portion 140 or sensor 146 in charging medium condition 148. Conductor 140 or sensor 146 stops the charging operation of electrochemical cell 100, by sending a signal to control circuit 134 to stop current source 126 from flowing current through conductor 128. Alternatively, the charging operation is stopped by short circuiting electrochemical cell 100, as discussed above, or by other methods of stopping the charging operation. Upon stopping the charging operation, charging medium 110 slows, or stops, progressing through anode 108.

Figure 10:
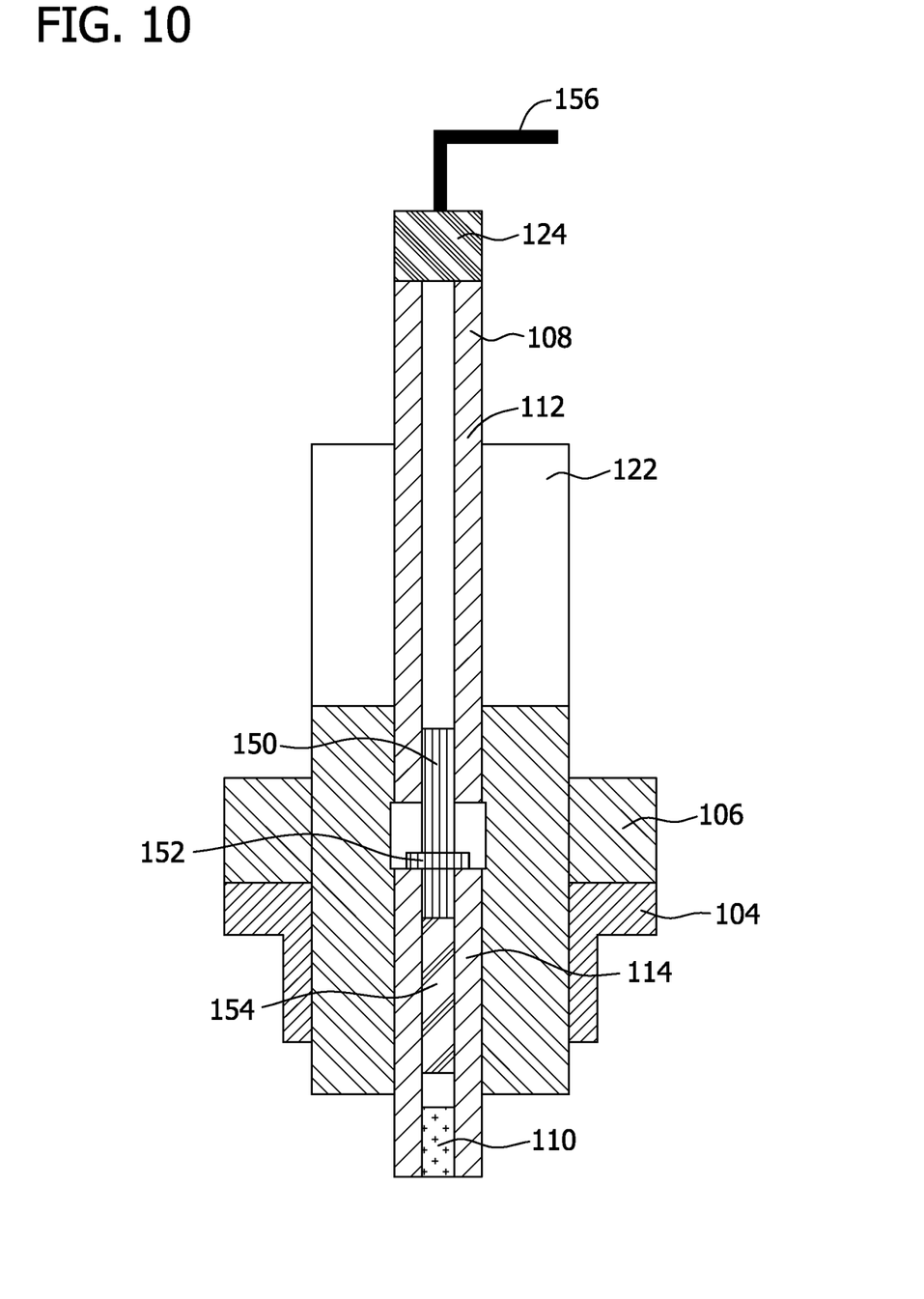
FIG. 10 is a cross section of a portion of an electrochemical cell, in a first state, according to a fourth embodiment of the present disclosure.

In one embodiment, electrochemical cell 100 includes a floating mechanical switch 150 as shown, for example, in FIG. 10. In another embodiment, floating mechanical switch 150 includes a stop ring 152 (FIGS. 10 and 11) for contacting anode 108 and/or to provide a sealing function. In yet another embodiment, floating mechanical switch 150 and stop ring 152 are formed of an electrically conductive material. In still another embodiment, floating mechanical switch 150 is attached to a non-conductive insulating portion 154, which may be an insulating ceramic material or the like.

In one embodiment, as shown in FIG. 10, floating mechanical switch 150 has a first state in which floating mechanical switch 150 contacts first portion 112 and second portion 114 of anode 108 to cause an electrical connection between first portion 112 and second portion 114 of anode 108.

Figure 11:
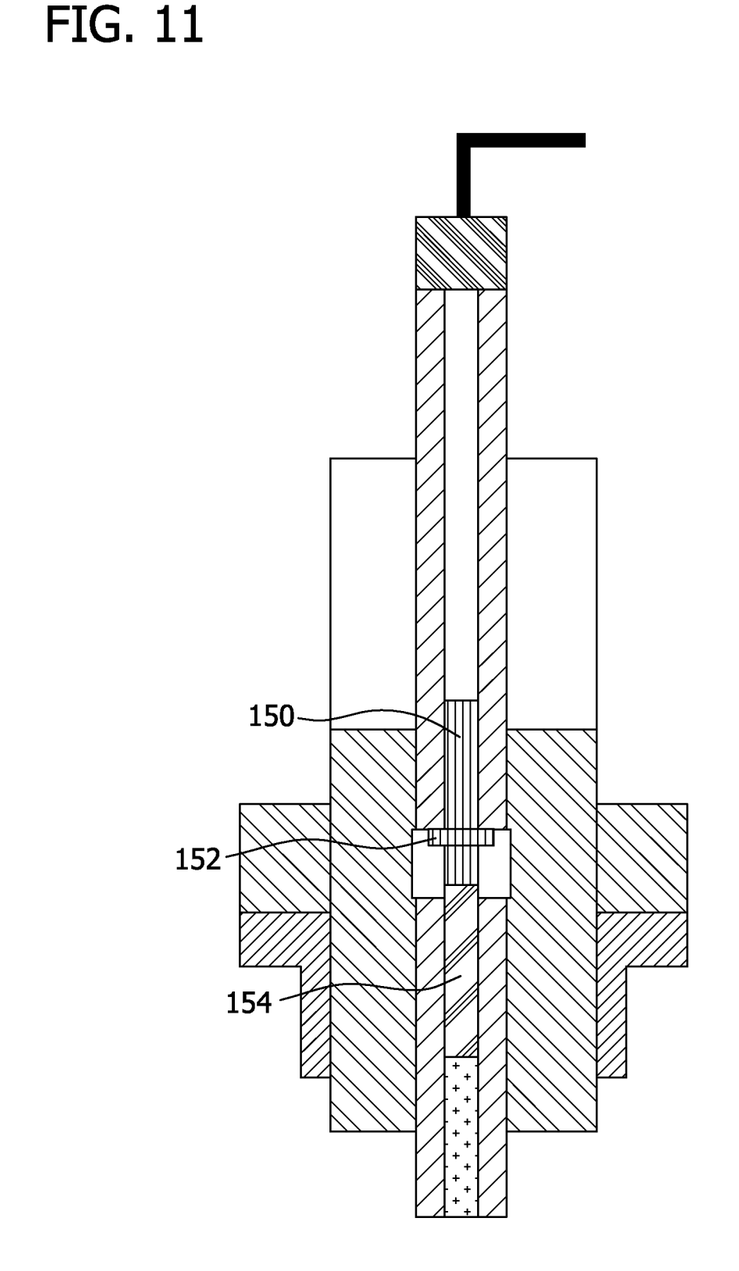
FIG. 11 is a cross section of a portion of the electrochemical cell shown in FIG. 10 in a second state.

In another embodiment, as shown in FIG. 11, a condition of charging medium 110 activates floating mechanical switch 150 to be in a second state such that first portion 112 and second portion 114 of anode 108 are not in electrical contact with one another to stop a charging operation of electrochemical cell 100. In yet another embodiment, the first state or the second state of floating mechanical switch 150 sends a signal to control circuit 134 via wire 156, or causes a short circuit of electrochemical cell 100, to stop a charging operation of electrochemical cell 100.

Figure 14:
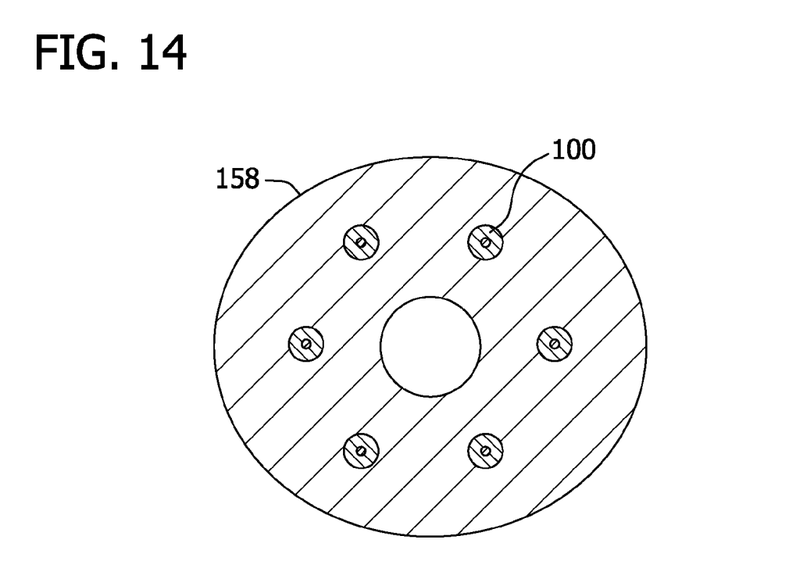
FIGS. 14 and 15 show cross sections of a battery comprising a plurality of electrochemical cells of the present disclosure.
Figure 15:
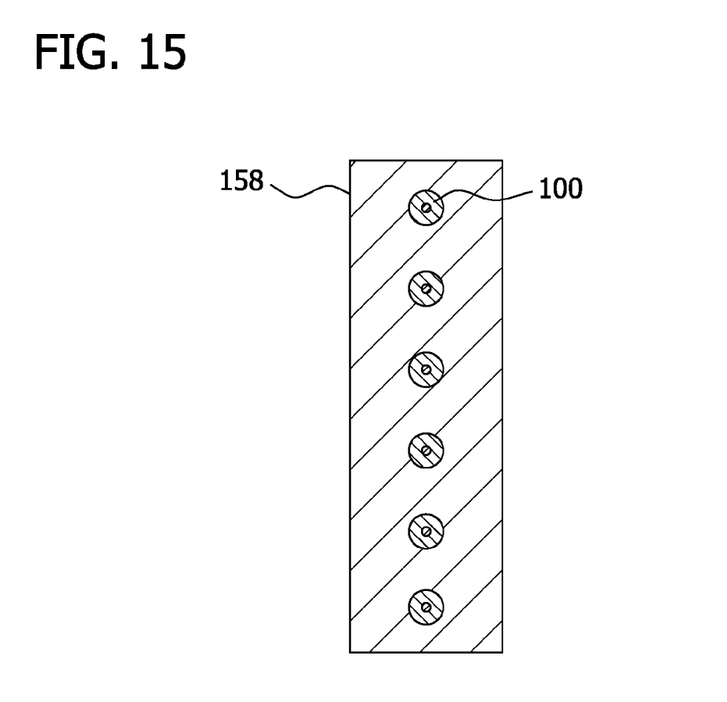

In some embodiments, a battery 158 (e.g., FIGS. 14 and 15) may include one or more electrochemical cells 100 according to the present disclosure. During a charging operation of the battery 158, the charging operation of individual electrochemical cells 100 may be stopped independently of one another to facilitate charging of the battery 158.

Figure 12:
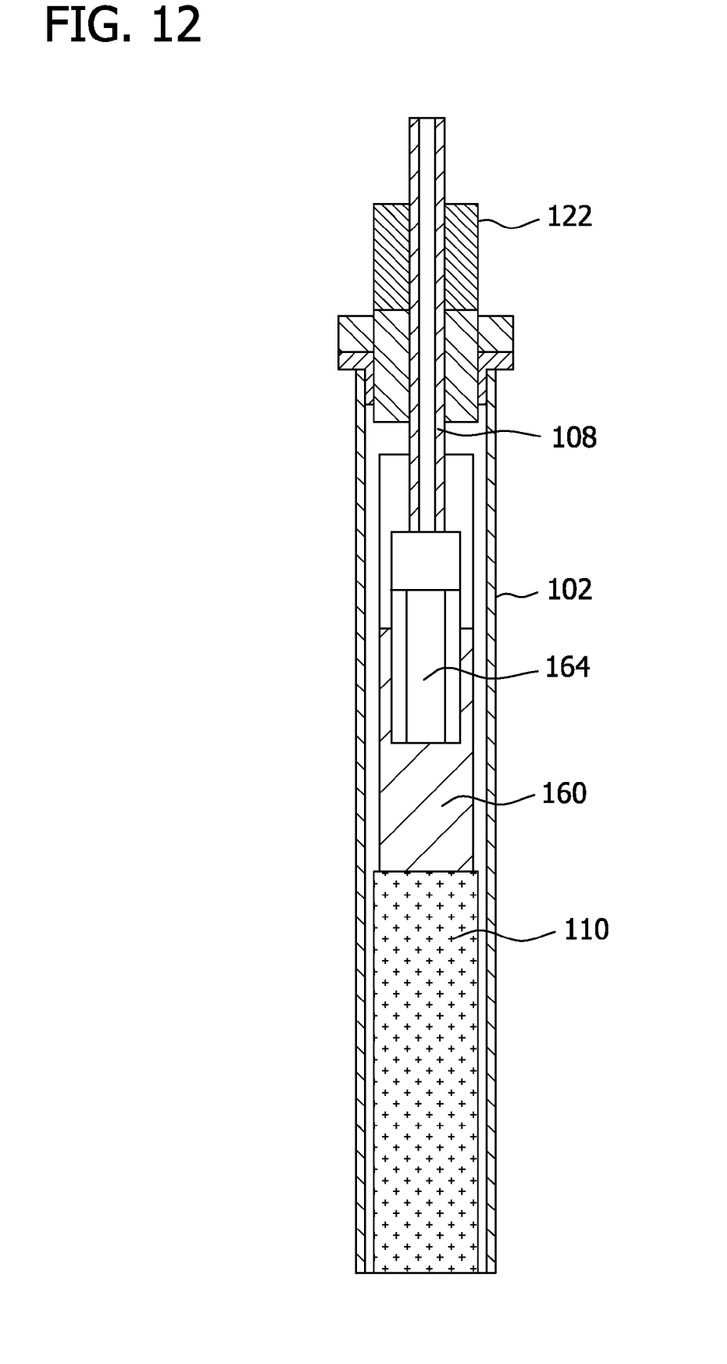
FIG. 12 is a cross section of a portion of an electrochemical cell in a first state, according to a fifth embodiment of the present disclosure.
Figure 13:
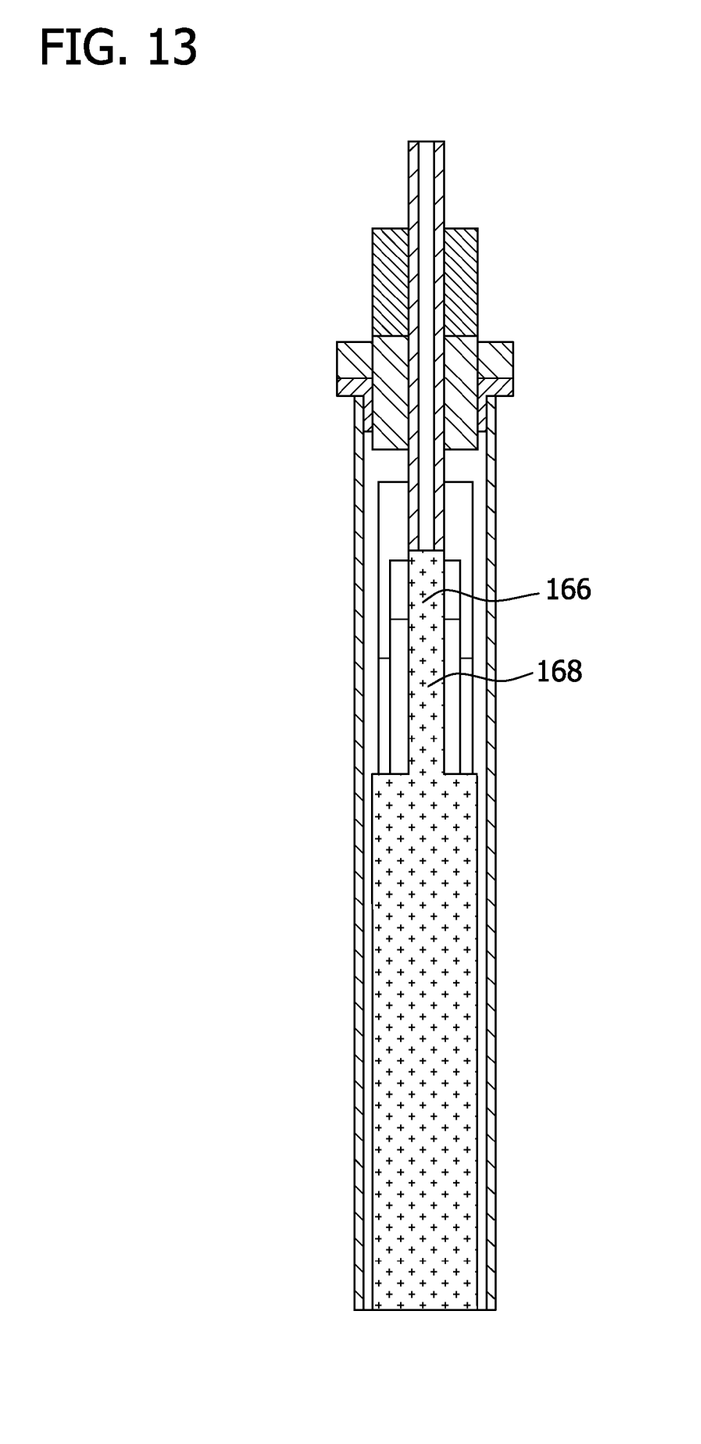
FIG. 13 is a cross section of a portion of the electrochemical cell shown in FIG. 12 in a second state.

In one embodiment, electrochemical cell 100 comprises a shim 160 (FIGS. 12 and 13) that allows charging medium 110, under a wicking or capillary action, to travel along membrane 102. In a first condition 164, a first electrical resistance of the electrochemical cell is measured. In a second condition 166, in which charging medium 110 fills at least a portion of cavity 168, the electrical resistance is reduced. Second condition 168, as detected or measured, is used to send a signal to control circuit 134 to stop the charging operation.

In some embodiments, the systems and method disclosed herein may be incorporated into a computer or stored on a computer readable medium.

The embodiments described herein are not limited to any particular system controller or processor for performing the processing tasks described herein. The term controller or processor, as used herein, is intended to denote any machine capable of performing the calculations, or computations, necessary to perform the tasks described herein. The terms controller and processor also are intended to denote any machine that is capable of accepting a structured input and of processing the input in accordance with prescribed rules to produce an output. It should also be noted that the phrase "configured to" as used herein means that the controller/processor is equipped with a combination of hardware and software for performing the tasks of embodiments of the invention, as will be understood by those skilled in the art. The term controller/processor, as used herein, refers to central processing units, microprocessors, microcontrollers, reduced instruction set circuits (RISC), application specific integrated circuits (ASIC), logic circuits, and any other circuit or processor capable of executing the functions described herein.

The embodiments described herein embrace one or more computer readable media, including non-transitory computer readable storage media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Aspects of the disclosure transform a general-purpose computer into a special-purpose computing device when configured to execute the instructions described herein. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrochemical cell comprising:
an anode connectable to a current tap;
a charging medium in electrical contact with said anode; and
a switching device configured to stop a charging operation of the electrochemical cell upon activation by said charging medium;
wherein said anode defines a cavity containing said charging medium, said anode having a first section and a second section separated by an insulating space such that the first section and the second section are not in electrical contact; and said switching device is configured to be activated by said charging medium occupying said insulating space.

2. The electrochemical cell according to claim 1, wherein said charging medium is a molten metal.

3. The electrochemical cell according to claim 1, wherein said charging medium is molten sodium.

4. The electrochemical cell according to claim 1, wherein said insulating space is at least partially defined by an insulating material.

5. The electrochemical cell according to claim 4, wherein said insulating material is an insulating ceramic material.

6. The electrochemical cell according to claim 1, wherein said switching device comprises a sensor configured to detect said charging medium and send a signal to a control circuit, and said control circuit is configured to stop the charging operation upon receipt of the signal.

7. The electrochemical cell according to claim 1, wherein said switching device, when activated, connects said anode to a cathode of the electrochemical cell to short circuit the electrochemical cell.

8. The electrochemical cell according to claim 1, wherein said switching device is a floating mechanical switch.

9. The electrochemical cell according to claim 8, wherein said switching device comprises a metal portion and a ceramic portion.

10. The electrochemical cell according to claim 1, wherein said switching device comprises a resistive element that is configured to change resistance when activated by said charging medium.

11. A method of charging an electrochemical cell, comprising:

providing an electrical current flow to the electrochemical cell to perform a charging operation;

determining a condition of a charging medium within the electrochemical cell;

stopping the charging operation upon determining the condition of the charging medium;

wherein the electrical current flow is provided to an anode of the electrochemical cell, said anode defining a cavity containing said charging medium, said anode having a first section and a second section separated by an insulating space such that the first section and the second section are not in electrical contact, and the condition to be determined is whether said charging medium occupies the insulating space.

12. The method of charging an electrochemical cell according to claim 11, wherein said charging medium is a molten metal.

13. The method of charging an electrochemical cell according to claim 11, wherein the electrochemical cell comprises a sensor configured to detect said charging medium and send a signal to a control circuit, and said control circuit is configured to stop the charging operation based upon the signal.

14. The method of charging an electrochemical cell according to claim 11, wherein stopping the charging operation comprises connecting an anode of the electrochemical cell to a cathode of the electrochemical cell to short circuit the electrochemical cell.

15. The method of charging an electrochemical cell according to claim 11, wherein a floating mechanical switch is used to stop the charging operation.

16. The method of charging an electrochemical cell according to claim 11, wherein the electrochemical cell comprises a resistive element configured to change resistance when activated by said charging medium, said resistive element being used to sense the condition of said charging medium.

17. A charging system for at least one electrochemical cell, comprising:

a current tap configured to supply an electrical current flow to the electrochemical cell;

a sensor configured to detect a condition of a charging medium within the electrochemical cell;

wherein the charging system is configured to stop a charging operation of the electrochemical cell upon detecting the condition of said charging medium, and wherein an anode of the electrochemical cell defines a cavity containing said charging medium, said anode having a first section and a second section separated by an insulating space such that the first section and the second section are not in electrical contact, and said sensor is activated by said charging medium occupying the insulating space.

18. The charging system for an electrochemical cell according to claim 17, wherein said charging medium is a molten metal.

19. The charging system according to claim 18, wherein the molten metal is molten sodium.

20. The charging system for an electrochemical cell according to claim 18, wherein the insulating space is at least partially defined by an insulating material.

21. The charging system for an electrochemical cell according to claim 18, wherein said sensor is configured to detect said charging medium and send a signal to a control circuit, and said control circuit is configured to stop the charging operation upon based upon the signal.

22. The charging system according to claim 21, wherein the sensor comprises a resistive element configured to sense the condition of said charging medium.

23. The charging system according to claim 17, wherein there are a plurality of electrochemical cells and the charging system is configured to individually stop a charging operation of one or more of the electrochemical cells upon detecting the condition of charging medium of the respective electrochemical cell.

* * * * *